(12) United States Patent
Schober et al.

(10) Patent No.: US 8,976,847 B2
(45) Date of Patent: Mar. 10, 2015

(54) COMMUNICATIONS SYSTEM AND METHOD FOR THE ADAPTATION OF TRANSMISSION PARAMETERS ON THE BASIS OF RELIABILITY INFORMATION OF RECONSTRUCTED DATA

(75) Inventors: Henrik Schober, Woerth (DE); Torsten Langguth, Unterhaching (DE)

(73) Assignee: Rohde & Schwarz GmbH & Co. KG, München (DE)

( * ) Notice: Subject to any disclaimer, the term of this patent is extended or adjusted under 35 U.S.C. 154(b) by 726 days.

(21) Appl. No.: 12/597,102

(22) PCT Filed: May 20, 2008

(86) PCT No.: PCT/EP2008/004038
§ 371 (c)(1),
(2), (4) Date: Jan. 5, 2010

(87) PCT Pub. No.: WO2008/154999
PCT Pub. Date: Dec. 24, 2008

(65) Prior Publication Data
US 2010/0128765 A1  May 27, 2010

(30) Foreign Application Priority Data

Jun. 21, 2007 (DE) .......... 10 2007 028 724
Nov. 21, 2007 (DE) .......... 10 2007 055 527

(51) Int. Cl.
*H04B 1/38* (2006.01)
*H04L 1/00* (2006.01)

(52) U.S. Cl.
CPC ............ *H04L 1/0006* (2013.01); *H04L 1/0003* (2013.01); *H04L 1/0009* (2013.01); *H04L 1/005* (2013.01); *H04L 1/0066* (2013.01)
USPC ........... 375/220; 375/221; 375/264; 375/219; 455/522; 455/295

(58) Field of Classification Search
USPC ........... 375/220, 221, 219; 370/203; 455/522, 455/295
See application file for complete search history.

(56) References Cited

U.S. PATENT DOCUMENTS 6,262,994 B1  7/2001  Dirschedl et al.
6,272,183 B1  8/2001  Berens et al.
(Continued)

FOREIGN PATENT DOCUMENTS

| DE | 19651593 A1 | 6/1998 |
|----|-------------|--------|
| DE | 19736625 C1 | 12/1998 |
| EP | 1384328 | 1/2004 |
| EP | 1463229 A1 | 9/2004 |
| WO | WO-02/069504 | 9/2002 |

OTHER PUBLICATIONS

International Search Report for PCT/EP2008/004038 dated Oct. 23, 2008.
Berrou et al., "Near Shannon Limit Error-Correcting Coding and Decoding: Turbo-Codes," IEEE International Conference on Communications, 2:1064-1070 (1993).

*Primary Examiner* — Eva Puente
(74) *Attorney, Agent, or Firm* — Marshall, Gerstein & Borun LLP

(57) ABSTRACT

A communications system provides a first communications device, which is connected via a bidirectional transmission channel to a second communications device, wherein the communications devices each comprise a data reconstruction unit. Each communications device comprises a control unit, which is provided for a configuration of various transmission parameters such as modulation type and/or code rate and/or transmitter power and/or size of data packets dependent upon a reliability value evaluated within the control unit. The reliability value indicates a probability for a reliability or a quality of a data reconstruction, which reconstructs transmitted data from received signals within the data reconstruction unit.

24 Claims, 2 Drawing Sheets

(56) References Cited

U.S. PATENT DOCUMENTS

| | | |
|---|---|---|
| 2004/0037262 A1 | 2/2004 | Tanada |
| 2005/0003848 A1 | 1/2005 | Chen et al. |
| 2006/0223478 A1* | 10/2006 | Carballo et al. ............. 455/295 |
| 2007/0101231 A1* | 5/2007 | Kutz et al. ..................... 714/755 |
| 2007/0201344 A1* | 8/2007 | Miyabayashi ................ 370/203 |
| 2010/0004015 A1* | 1/2010 | Nilsson et al. ................ 455/522 |
| 2011/0243205 A1* | 10/2011 | Choi et al. .................... 375/221 |

* cited by examiner

COMMUNICATIONS SYSTEM AND METHOD FOR THE ADAPTATION OF TRANSMISSION PARAMETERS ON THE BASIS OF RELIABILITY INFORMATION OF RECONSTRUCTED DATA

BACKGROUND OF THE INVENTION

1. Field of the Invention

The invention relates to a communications system with transmission parameters configurable dependent upon a reliability value and to a method for the adaptation of these transmission parameters on the basis of reliability information, which is calculated for every bit in a datastream by means of an (also iterative) estimation algorithm.

2. Related Technology

Radio communications systems transmit information via transmission channels, of which the properties can generally only be described through statistical values or statistical models. In addition to the noise, such as the additive white noise (additive white Gaussian noise; AWGN), the multi-path propagation with the associated fading also plays a significant role in the interpretation and performance of radio communications systems. In the case of multi-path propagation, the radio signals broadcast from the antenna reach different propagation paths of the reception system. The radio signals can be reflected, fragmented or scattered by obstacles and accordingly reach the reception unit with an arbitrary amplitude and arbitrary phase. Within the reception unit, the radio signals of all propagation paths are superimposed and lead to constructive or destructive superposition (interference), wherein the constructive interference brings about a mutual amplification of signal components, and the destructive interference brings about a mutual cancellation of signal components. Moreover, in the case of a movement of the participants, Doppler effects cause additional interfering influences on the radio signal.

In order to achieve an optimal data transmission with minimal use of energy and/or maximum range, especially over a time-variable transmission channel, the data to be transmitted are secured within the transmission unit by means of a channel coding, which systematically adds redundancy to the actual information. In the reception unit, the systematically added redundancy allows an improved detection of the originally transmitted data. The channel coding means that the effects of the interfering influences named above on the transmitted data can be reduced within the reception unit, so that the data reconstruction is more reliable as a whole.

To achieve the most efficient possible exploitation of a time variable transmission channel, the data transmission rate should also be time variable and matched in an adaptive manner to the current properties of the transmission channel. Accordingly, for example, with good transmission channels, a high-quality digital modulation method or a relatively high code rate can be adjusted. By contrast, with poor transmission channels, it should be possible to select relatively more robust transmission modes (modulation method with reduced symbol size or respectively smaller code rate).

The evaluation of the current channel properties for the adjustment of the transmission parameters is achieved according to the prior art by an estimation of the signal-to-noise ratio (signal-to-noise ratio, SNR) and the received signal strength (received signal strength indication RSSI) or the evaluation of transmission errors (packet error rate, PER). An estimation of the SNR can be obtained, for example, via the comparison of known synchronization or training sequences with the received signal. Since the channel influences, such as the noise or the amplitude and phase distribution of the multiple paths is arbitrary and can therefore be described only with statistical models, and the estimation is implemented only over a short period, the estimation is not optimal and provides estimation inaccuracies. Statements or estimates with low estimation errors are possible only via lengthy averaging. Instead of known synchronization and training sequences, the estimated received symbols can also be used after the detection for the estimation of the SNR (decision feedback method). However, in this case, detection errors in the data and their probability of occurrence have a considerable influence on the accuracy of the estimation algorithm for the SNR.

An estimator for the SNR provides further disadvantages. The SNR does not reflect the influence of interference on the performance of the decoder for the channel decoding. In spite of a good SNR, it is possible that the interference and the channel properties lead to the channel decoding delivering poor results. Conversely, in spite of a relatively poor SNR, an error-free decoding may still be possible. One further disadvantage occurs if the signal quality during a data transmission is to be determined continuously. If synchronization and training sequences are to be used for the estimation, these must be present in the signal continuously, in order to be able to implement a new estimation at an arbitrary timing point. A continuous estimation can only be realized with decision feedback algorithms (decision feedback algorithms) with the disadvantages named above.

German patent specification DE 196 51 593 A1 relates to an arrangement, which is used for the optimization of a data transmission via a bidirectional radio channel. For the bidirectional radio channel, various modulation types can be selected at the transmitter end, wherein the code rate of the forward error correction (FEC) and the transmitter power can be adjusted simultaneously. At the receiver end, modules are provided, which determine the error rate and communicate this back to the transmitter. On the basis of the returned error rate, parameters such as the modulation type, the code rate in the channel coding, the transmitter power and the size of the data packets are configured or adjusted within the transmitter unit in such a manner that a defined error rate cannot be exceeded in the receiver.

The disadvantage with this arrangement is that only the error rate, which occurs with the transmission via the radio channel, is used as the sole criterion for the configuration of the transmission unit. Accordingly, it is very improbable that the transmission unit is configured in an optimal manner, and that a maximal data transmission rate with error-free transmission is possible with this arrangement. This method is based upon the evaluation of transmission errors; the adaptation of the parameters before the occurrence of errors is not possible.

SUMMARY OF THE INVENTION

The invention specifies a communications system and a method for a data transmission, with which the transmission parameters can be adapted on the basis of reliability values for the estimation of the transmitted data.

Accordingly, the invention provides a communications system with at least one first communications device, which is connected via a bidirectional transmission channel to at least one second communications device, wherein the communications devices each comprise a data reconstruction unit, wherein both communications devices each provide a control unit, which implements a configuration of various transmission parameters, such as, in particular, modulation type and/or code rate and/or transmitter power and/or size of data packets, dependent upon a reliability value evaluated in the control unit, and wherein the reliability value indicates a probability for a reliability or a quality of a data reconstruction, which reconstructs transmitted data from received signals within the data reconstruction unit.

The invention assumes a communications system with at least one first communications device, which is connected via a bidirectional transmission channel to at least one second communications device. Both communications devices each comprise a data reconstruction unit and a control unit. The control unit is used to implement a configuration of various transmission parameters, such as modulation type and/or code rate and/or transmitter power and/or size of data packets dependent upon a reliability value, which is evaluated within the control unit. The reliability value generated in the reception unit indicates a probability for a reliability or a quality of a data reconstruction, which reconstructs transmitted data from received signals within the data reconstruction unit.

In this context, the reliability information can be determined for every transmitted bit. Moreover, the method according to the invention implicitly allows an adaptation of the parameters on the basis of all influencing factors of the transmission path and an adaptation before transmission errors occur. This is achieved by adapting the transmission parameters, if the reliability values of the decisions become poorer and, for example, reach a given threshold.

One advantage of the communications system according to the invention is that the adaptation of transmission parameters or transmitter parameters such as the modulation method, channel coding, transmitter power and the size of the data packets to be transmitted are controlled on the basis of reliability values. These reliability values are calculated continuously for the received data during the decoding process of the channel decoding, so that a real-time adaptation of the transmission parameters to a current transmission channel is possible, wherein the reliability values also take into consideration interference which does not occur in the transmission channel, but which is, for example, systematic interference or errors from other units within the overall message transmission chain.

In particular, it is advantageous if these reliability values (e.g. soft information, such as, for example, the log-likelihood ratio LLR, wherein the LLR value corresponds to the logarithm of the ratio of the probabilities for a transmitted zero P(0) or for a transmitted one P(1);

$$LLR = \log\left(\frac{P(0)}{P(1)}\right)$$

are calculated for every received bit during the channel decoding. The reliability value provides a measure for the probability, with which the estimation just implemented for the observed data bit is correct, and can be used, for example, by the iterative decoding (for example, turbo codes) or the interlinked demodulation and channel decoding. After the decoding or respectively demodulation, a hard decision can be made with regard to the bit most probably transmitted, wherein the decision is generally made on the basis of a signing decision.

Moreover, it is an advantage of the communications system according to the invention that the reliability information determined in the channel decoder is further exploited in order to determine the transmission parameters for a subsequent transmission, wherein the subsequent transmission is implemented within the same communications unit as the evaluation of the reliability information (open-loop method).

As an alternative to the open-loop method, it is possible that the evaluation of the reliability information and the adjustment of the transmission parameter is implemented in different communications units, wherein the evaluated reliability information is transmitted via the transmission channel to a second communications unit and taken into consideration there in the adjustment of the transmission parameters (closed-loop method).

In this context, it is advantageous that higher data rates can be transmitted via the transmission channel, the better the reliability values are, since the reception unit was able to estimate the data correspondingly well within the communications units.

The advantages achieved with the invention or respectively with its further developments also consist, in particular, in that, within a communications unit, a first processing unit for data to be transmitted (transmission unit) and a second processing unit for the signals received are connected to one another via a control unit. As a result, the currently determined reliability values of the received data can be used to configure or to adjust a transmission transmitted from this communications unit within the same communications unit (open loop), or to configure or adjust the transmission parameters of a peer communications unit (closed loop).

Furthermore, it is advantageous if the channel decoder connected to the demodulator is a turbo decoder, of which the decoding method provides several iterative steps, wherein a number of the iterative steps implemented, the characteristic of the reliability information within the iterative process and the reliability value of the data reconstruction is routed to the decision unit and to the control unit. As a result, the adaptation of the transmission parameters to the channel is improved as a whole, since the number of iterative steps implemented represents a supplementary reliability criterion.

Moreover, it is advantageous if the reliability value formed from the LLR value is taken into consideration in the decision unit for a signing decision.

Furthermore, it is advantageous if the transmission parameters are configured dependent upon the currently received reliability values within the second processing unit of the first communications unit of the communications system according to the invention, and then routed to a channel coder and to a modulator of the first processing unit of the first communications unit. As a result, a configuration is realized according to the open-loop method, so that the transmission parameters can be adjusted in a real-time optimized manner with the condition that the transmission channel and reception channel are symmetrical with regard to their transmission properties.

Moreover, it is advantageous if, in the second processing unit of the first communications unit, the transmission parameters are configured dependent upon the currently received reliability values and then routed via the transmission channel to a channel coder and to a modulator of the first processing unit of the second communications unit. Accordingly, a closed-loop method is implemented, wherein the control unit can advantageously use either the open-loop method or the closed-loop method.

The communications system according to the invention advantageously comprises an adjustment of the transmission parameters in the first processing unit, wherein amongst others, the following transmission parameters can be optimized: modulation type, symbol size of the modulation type, transmitter power, size of the data packets to be transmitted, channel coding method and its code rate.

The invention also provides a method for the adaptation of transmission parameters within a communications system with at least one first communications direction and with at least one second communications direction and a time-variable transmission channel, wherein the communications directions each provide a transmission unit and reception unit with a data reconstruction unit, wherein the transmission unit and reception unit of a communications direction are connected to one another via a control unit, and wherein the method comprises evaluating, within the control unit of the first communications direction, a reliability value, which indicates a probability for a reliability or a quality of a data reconstruction, from this evaluation, determining transmission parameters, which are adapted to the transmission channel, and adjusting these transmission parameters either in the transmission unit of the first communications direction (open loop) or communicating the transmission parameters to the second communications direction and adjusting the transmission parameters within the transmission unit of the second communications direction (closed loop).

The method according to the invention for the adaptation of transmission parameters within a communications system runs through several method steps. Within the control unit of the first communications unit, a reliability value, which indicates a measure for the reliability or a measure for the quality of a data reconstruction, is evaluated. Transmission parameters, which are adapted to the currently used transmission channel, are then determined from this evaluation. These transmission parameters are either adjusted within the transmission unit of the first communications unit (open-loop method) or communicated to the second communications unit and adjusted within the transmission unit of the second communications unit (closed-loop method).

One advantage of the method according to the invention is that the adaptation of the transmission parameters is implemented on the basis of information, which takes into consideration the overall influence of the transmission path including the modulation method and the channel coding method and their mutual influences. Accordingly, the capability of the decoder of the channel decoding, for example, to compensate the momentary and arbitrary interference of the channel, is also implicitly included. This information cannot be obtained exclusively via the signal-to-noise ratio or the signal strength.

Furthermore, it is advantageous that, in the case of a transmission via the time variable transmission channel, the transmission path is continuously evaluated and a real-time response to changes in the transmission channel is provided by means of the method according to the invention by adapting the corresponding parameters.

According to an advantageous further development, the method according to the invention comprises the step that the reliability value is determined for individual bits in a channel decoder by means of an iterative estimation method. Additional information, which allows an improved adjustment of the transmission parameters, can be obtained from the characteristic of the reliability value during the individual iterations.

By preference, the characteristic of the reliability information is registered in the reception unit and evaluated in the control unit.

By preference, the reliability value is formed from the log-likelihood ratio for an estimated bit or from the number of iterative steps, which were necessary for a required degree of reliability or from an averaging of the number of these iterative steps. This has the advantage, that several mutually-supporting criteria are used for the evaluation of the reliability of the channel decoding or respectively of the data reconstruction.

Moreover, it is advantageous if the reliability value corresponds to a 2-tuple, which is formed from the log-likelihood ratio (LLR) and the number of required iterative steps or from the log-likelihood ratio (LLR) and the mean value of the number of iterative steps.

The iterative estimation method is advantageously implemented in a channel decoder with at least one first decoder and at least one second decoder. In this context, a reliability value is specified as an interruption condition, and the number of iterative steps at initialization is set to zero. The estimation method mentioned above itself preferably provides the following iterative steps:

A first part of the data stream is supplied to the first decoder, which determines for every bit of the data stream a first estimated value for the corresponding bit and also a first reliability information relating to this estimated value.

This first reliability information is communicated to the second decoder as an a priori information (a priori information). Taking into consideration this a priori information, the second decoder determines for every bit of a second part of the data stream both a second estimated value and also a second reliability information relating to this estimated value.

This second estimated value is once again supplied to the first decoder and used as the next a priori information in the subsequent iterative step. Following this, a number of iterative steps is incremented in a counter.

The iterative estimation method is interrupted, as soon as the first reliability information and/or the second reliability information is/are greater than or equal to the value of the interruption condition.

In this exemplary embodiment, the reliability value of the iterative estimation method, which corresponds to the second reliability information, is determined at the output of the channel decoder. Moreover, a 2-tuple, which provides an improved statement regarding the quality of the method just implemented, is formed repeatedly and continuously from the number of iterative steps.

The iterative estimation method is expediently implemented in a channel decoder of a receiver unit of a communications device.

With the present invention, the transmission parameters are advantageously not adjusted on the basis of SNR values (signal-to-noise ratio), RSSI values (received-signal-strength-indication, received signal strength) or the evaluation of transmission errors, but instead reliability values are used, which are calculated in the decoding of the bits. As possible values, reliability values, for example, from the SOVA algorithm (soft output Viterbi algorithm) or the LLR values of a turbo decoder can be used. Accordingly, the transmission parameters can be adjusted on the basis of an item of information, which also takes into consideration the coding and modulation properties and their mutual interactions, in addition to the current channel properties (signal-to-noise ratio SNR, multipath situation, Doppler etc.).

BRIEF DESCRIPTION OF THE DRAWINGS

Exemplary embodiments of the present invention are described below. Both the structure and also the method of operation of the invention and its further advantages and objects are best understood with reference to the following description in conjunction with the associated drawings. The drawings are as follows.

DETAILED DESCRIPTION

Corresponding parts have been provided with the same reference numbers in all drawings.

Figure 1:
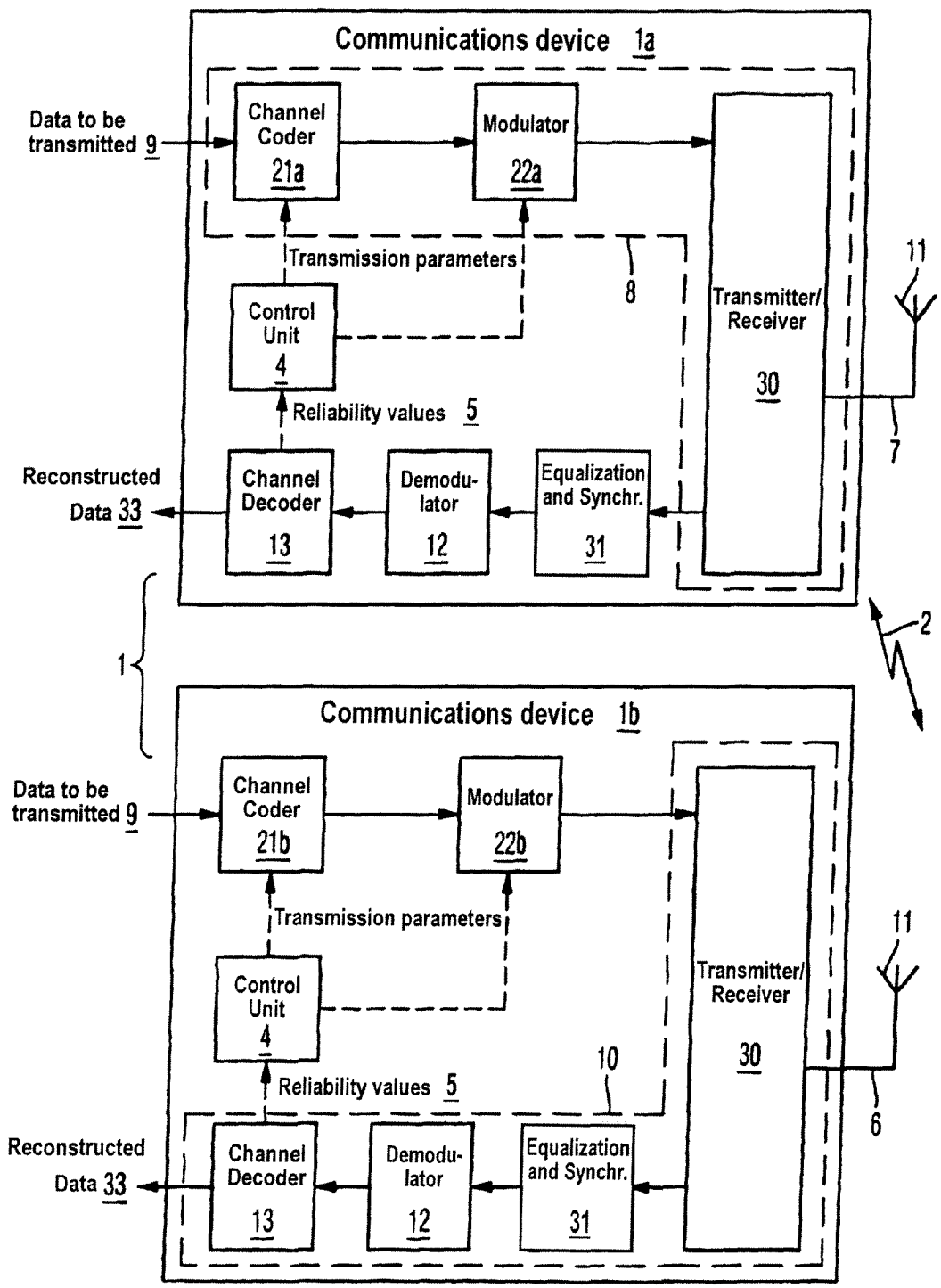
FIG. 1 shows an exemplary embodiment of a communications system according to the invention and FIG. 2 shows a detailed scheme for a processing unit or a reception unit of a communications device of the communications system according to the invention.

FIG. 1 shows an exemplary embodiment of a communications system 1 according to the invention, which comprises at least one first communications device 1a, which is connected via a bidirectional transmission channel 2 to at least one second communications device 1b. Both communications devices 1a, 1b each comprise a data reconstruction unit 3 and a control unit 4, which implements a configuration of various transmission parameters such as modulation type and/or code rate and/or transmitter power and/or size of data packets dependent upon a reliability value 5 evaluated in the control unit 4. The reliability value 5 indicates a probability for a reliability or a probability for a quality of a data reconstruction, which reconstructs transmitted data 7 from received signals 6 in the data reconstruction unit 1

Within the transmission unit 8 of the first communications device 1a, redundancy is systematically added in the channel coder 21a to the data 9 to be transmitted. Following this, the bits are converted via the control unit 4 corresponding to the modulation methods adjusted in the modulator 22a into symbols, which are mixed in the transmitter/receiver 30 up to the transmission frequency. In the transmission channel 2, the transmitted data 7 or the transmitted signals may be subject to a multi-path propagation and disturbed in amplitude and phase, for example, through reflection, scattering, Doppler effect and noise.

In the reception unit 10 or the processing unit of the second communications device 1b, the received signals 6, which have experienced an interference, amongst others in the transmission channel 2, are filtered out in the transmitter/receiver 30 and converted into the digital baseband for further processing. The synchronization and a channel equalization, which largely compensates, for example, the influences of the multi-path propagation, are implemented in an equalization and synchronization unit 31. After the equalization, the demodulation is implemented in the demodulator 12, and the channel decoding or the removal of redundancy added in the channel coding method is implemented in the channel decoder 13. The most probably transmitted data 9 are estimated on the basis of the results of the channel decoding.

Figure 2:
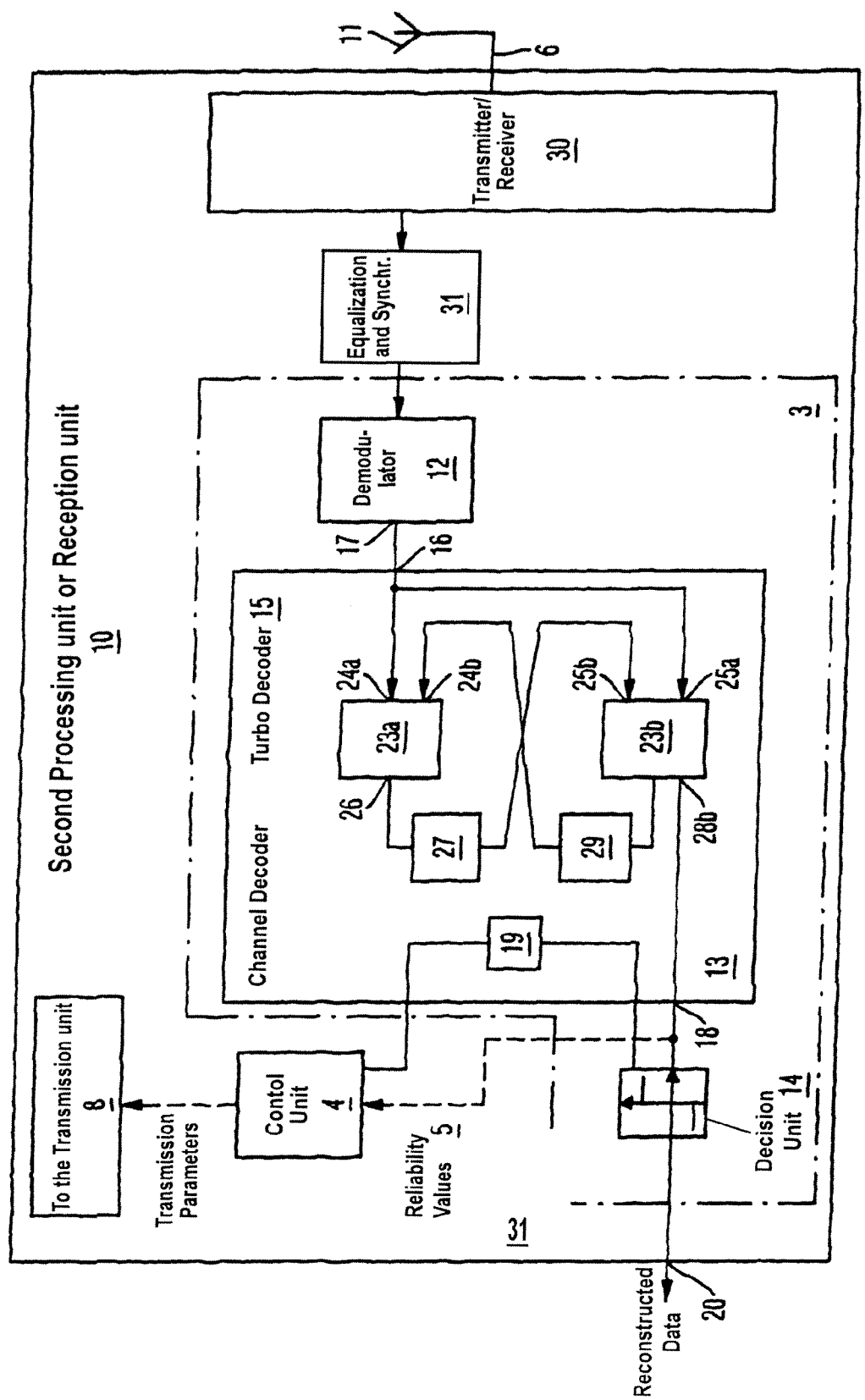

The communications devices 1a, 1b of the communications system 1 according to the invention each provide a first processing unit 8 or respectively a transmission unit 8 for data 9 to be transmitted and in each case a second processing unit 10 or a reception unit 10 for the received signals 6, wherein the second processing unit 10 is illustrated in FIG. 2. Both processing units 8, 10 of a communications unit 1a, 1b are connected to one another via the control unit 4. Two processing units of two mutually-communicating communications units 1a, 1b are connected to one another via the transmission channel 2 according to FIG. 1.

FIG. 2 shows a detailed scheme of a second processing unit 10 or reception unit 10 of a communications unit 1a, 1b of the communications system 1 according to the invention. As shown in FIG. 2, the reception unit 10 comprises an antenna 11 for the transmission and reception of signals, a transmitter/receiver 30, and a unit 31 for equalization and synchronization of the received signals 6. The data reconstruction unit 3 is connected to the unit 31 for the equalization and synchronization of the received signals 6.

In each case, a communications device 1a, 1b of the communications system 1 according to the invention comprises a data reconstruction unit 3 with a demodulator 12 and with a channel decoder 13 and with a decision unit 14. The channel decoder 13 connected to the demodulator 12 in the illustrated preferred exemplary embodiment is a turbo decoder 15, of which the decoding method provides several iterative steps, wherein a number of implemented iterative steps and in each case a reliability value 5 relating to the data reconstruction is routed to the decision unit 14 and to the control unit 4.

Within the decision unit 14, a signing decision is made. The number of necessary iterative steps determined by means of the counter 19 and/or the characteristic of the reliability values is evaluated in the control unit 4. An input 16 of the channel decoder 13 in the reception unit 10 of the communications device 1a, 1b is connected to an output 17 of the demodulator 12. An output 18 of the channel decoder 13 is connected to the decision unit 14.

The decision unit 14 is connected to the output 20 of the respective communications device 1a, 1b and to the output 18 of the channel decoder 13 of the data reconstruction unit 3.

Within the control unit 4 of a second communications device 1b, the transmission parameters are determined dependent upon the currently received reliability values 5 and then routed to a channel coder 21 and to a modulator 22 of the first processing unit 8 or transmission unit 8 of the second communications device 1b (open-loop method).

Within the control unit 4 of the second communications device 1b, the transmission parameters are determined dependent upon the currently received reliability values 5 and then routed via the transmission channel 2 to a channel coder 21 and to a modulator 22 of the first processing unit 8 or the transmission unit 8 of a first communications device 1a (closed-loop method). This feature is clearly illustrated in FIG. 1 in conjunction with FIG. 2.

The channel decoder 13 in the reception unit 10 of a communications device 1a, 1b provides a first decoder 23a and a second decoder 23b. Both decoders 23a, 23b each comprise two inputs 24a, 24b, 25a, 25b, wherein, in each case, a first input 24a, 25a of the two decoders 23a, 23b is connected to the output 17 of the demodulator 12, and both decoders 23a, 23b systematically process different bits of a bit stream output by the demodulator 12. The first decoder 23a of the channel decoder 13 provides an output 26, which is connected via an interleaver unit (interleaver) 27 to a second input 25b of the second decoder 23b. The second decoder 23b of the channel decoder 13 provides a first output 28a and a second output 28b, wherein the first output 28a is connected via a de-interleaver (de-interleaver) 29 to the second input 24b of the first decoder 23a. The second output 28b of the second decoder 23b is connected to the output 18 of the channel decoder 13.

Within the communications system 1 according to the invention, the transmission parameters are adjusted in the first processing unit 8 respectively of a communications device 1a, 1b, wherein, by preference, at least the following transmission parameters are configurable or adjustable:

Modulation type and/or
Symbol size of the modulation type and/or
Transmitter power and/or
Size of the data packet and/or
channel coding method or its code rate.

The method according to the invention for the adaptation of transmission parameters within a communications system 1 with at least one first communications device 1a and with at least one second communications device 1b can be used on a time variable transmission channel 2. Both communications devices 1a, 1b provide respectively a transmission unit 8 and a reception unit 10 with a data reconstruction unit 4, wherein the transmission unit 8 and the reception unit 10 of a communications device 1a, 1b are connected to one another via a control unit 4. The method according to the invention runs through the following method steps:

in the control unit 4 of the first communications device 18, a reliability value, which indicates a probability for a reliability or a quality of the data reconstruction, is evaluated, from this evaluation, transmission parameters are determined, which are adapted to the transmission channel 2, these transmission parameters 2 are adjusted either in the transmission unit 8 of the first communications device 1a (open loop) or communicated to the second communications device 1b and adjusted in the transmission unit 8 of the second communications device 1b (closed loop).

The reliability value 5 is determined in a channel decoder 13 (also by means of an iterative) estimation method for individual bits, wherein the iterative method can provide a flexible number of iterative steps, and the number of iterative steps can be registered in the reception unit 10 by means of a counter 19 and evaluated within the control unit 4.

The reliability value 5 is formed, in the case of the method according to the invention, from the log-likelihood ratio for an estimated bit, wherein the number of iterative steps, which are required in order to reach a reliability threshold can also be interpreted as a reliability value 5. The method according to the invention preferably also comprises the feature, that the reliability value 5 is formed, for example, from an averaging of the number of required iterative steps of the bits.

Furthermore, the reliability value 5 corresponds to a 2-tuple, which is formed from the log-likelihood ratio and the number of iterative steps or from the log-likelihood ratio and the mean value of the number of iterative steps.

The exemplary embodiment according to the invention of a method for estimating individual bits in a data stream by means of an iterative estimation algorithm is implemented in each case within a channel decoder 13 of the communications system 1 according to the invention.

The channel decoder 13 comprises at least one first decoder 23a and a second decoder 23b, wherein, within an initialization step, a suitable first a priori information for the first decoder 23a is adjusted, a value for the interruption condition is determined and a number of iterative steps at the beginning of the iteration or at the initialization is zero. The iterative estimation algorithm is based upon the following iterative steps:

A first part of a data stream is supplied to the first decoder 23a, which, for every bit of the data stream, taking into consideration the first a priori information, determines both a first estimated value for the corresponding bit and also a first reliability information relating to this estimated value.

The first reliability information is communicated to the second decoder 23b as a second a priori information. For every bit of a second part of the data stream, taking into consideration the second a priori information, the second decoder 23b determines both a second estimated value and also a second reliability information relating to this estimated value. This second estimated value is once again supplied to the first decoder 23a and used as the next, first a priori information in the following iterative step.

The number of iterative steps is incremented, and the iterative estimation algorithm is interrupted as soon as the first reliability information and/or the second reliability information is greater than or equal to the value of the interruption condition.

The method described above provides that, from a reliability value 5 present at the output 18 of the channel decoder 13, which corresponds to the second reliability information, and the number of iterative steps, a 2-tuple can be formed, which provides an improved statement regarding the quality of the data reconstruction method just implemented, wherein the 2-tuple is formed repeatedly and continuously.

The invention is not restricted to the exemplary embodiment presented in the drawings, in particular not to a commercial radio system, such as GSM or UMTS. All of the features described above and illustrated in the drawings can be combined with one another as required.

The invention claimed is:

1. A communications system with at least one first communications device, which is connected via a bidirectional transmission channel to at least one second communications device, wherein:

the communications devices each comprise a data reconstruction unit, a control unit operatively coupled to the data reconstruction unit, a channel coder operatively coupled to the control unit and a modulator operatively coupled to the channel coder, wherein the control unit is adapted to implement a configuration of transmission parameters, dependent upon a reliability value evaluated in the control unit, wherein the reliability value indicates a probability for a reliability or a quality of a data reconstruction, which reconstructs transmitted data from received signals within the data reconstruction unit, wherein the transmission parameters are adjusted on the basis of the reliability value and channel properties, the reliability value taking into consideration the coding properties, modulation properties and mutual interactions of the coding and modulation properties, wherein the channel properties comprise one or more of signal to noise ratio, multi-path propagation and Doppler effects, and wherein the transmission parameters in the first communications device are adjusted on the basis of the reliability values and comprise one or more of the following transmission parameters in their entirety or in part: modulation type, symbol size of the modulation type, size of a data packet, channel coding method, and code rate.

2. The communications system according to claim 1, wherein the communications devices each provide a first processing unit (transmission unit) for data to be transmitted and each comprises a second processing unit (reception unit) for the received signals, wherein the first and second processing units are connected to one another via the control unit.

3. The communications system according to claim 1, wherein the data reconstruction unit comprises a demodulator, a channel decoder, and a decision unit.

4. The communications system according to claim 3, wherein the channel decoder connected to the demodulator is a turbo-decoder utilizing a decoding method that comprises several iterative steps, wherein a number of the implemented iterative steps and the reliability value of the data reconstruction are routed to the decision unit and/or to the control unit.

5. The communications system according to claim 3, wherein an input of the channel decoder is connected to an output of the demodulator, and an output of the channel decoder is connected to the decision unit.

6. The communications system according to claim 3, wherein the decision unit takes the reliability value into consideration for a signing decision.

7. The communications system according to claim 3, wherein the control unit evaluates a determined number of iterative steps with a counter.

8. The communications system according to claim 3, wherein the decision unit is connected to the output of the respective communications device and to the output of the channel decoder of the data reconstruction unit.

9. The communications system according to claim 2, wherein the second processing unit of the first communications device configures the transmission parameters dependent upon the currently received reliability values and then routes them to a channel coder and to a modulator of the first processing unit of the first communications device.

10. The communications system according to claim 2, wherein the second processing unit of the second communications device configures the transmission parameters dependent upon the currently received reliability values and then routes the transmission parameters via the transmission channel to a channel coder and to a modulator of the first processing unit of the second communications device.

11. The communications system according to claim 3, wherein the channel decoder provides a first decoder and a second decoder with respectively two inputs.

12. The communications system according to claim 11, wherein a first input of the two decoders is connected to the output of the demodulator, and both decoders process systematically different data of a data stream flowing from the demodulator.

13. The communications system according to claim 12, wherein the first decoder of the channel decoder provides an output, which is connected via an interleaver unit to a second input of the second decoder.

14. The communications system according to claim 11, wherein the second decoder of the channel decoder provides a first output and a second output, wherein the first output is connected via a de-interleaver unit to the second input of the first decoder.

15. The communications system according to claim 14, wherein the second output of the second decoder is connected to the output of the channel decoder.

16. A method for the adaptation of transmission parameters within a communications system with at least one first communications direction and with at least one second communications direction and a time-variable transmission channel, wherein the first and second communications directions each provide a transmission unit and reception unit with a data reconstruction unit, wherein the transmission unit and reception unit of a communications direction are connected to one another via a control unit, and wherein the control unit is operatively coupled to the data reconstruction unit, a channel coder is operatively coupled to the control unit and a modulator is operatively coupled to the channel coder, wherein the method comprises:

within the control unit of the first communications direction, evaluating a reliability value, which indicates a probability for a reliability or a quality of a data reconstruction, from this evaluation, determining transmission parameters, which are adapted to the transmission channel, adjusting the transmission parameters in the transmission unit of the first communications direction (open loop) or communicating the transmission parameters to the second communications direction and adjusting the transmission parameters within the transmission unit of the second communications direction (closed loop), wherein the transmission parameters are adjusted on the basis of the reliability value and channel properties, the reliability value taking into consideration the coding properties, modulation properties and mutual interactions of the coding and modulation properties, wherein the channel properties comprise one or more of signal to noise ratio, multi-path propagation and Doppler effects, and wherein the transmission parameters in the first communications device are adjusted on the basis of the reliability values and comprise one or more of the following transmission parameters in their entirety or in part: modulation type, symbol size of the modulation type, size of a data packet, channel coding method, and code rate.

17. The method according to claim 16, comprising determining the reliability value for individual bits in a channel decoder.

18. The method according to claim 16, comprising determining the reliability value for individual bits in a channel decoder by an iterative estimation method.

19. The method according to claim 18, wherein the iterative method provides a flexible number of iterative steps.

20. The method according to claim 19, comprising registering the number of iterative steps in the reception unit by a counter and evaluating the iterative steps within the control unit.

21. The method according to claim 16, comprising forming the reliability value from a log-likelihood ratio for an estimated bit.

22. The method according to claim 19, comprising forming the reliability value from an averaging of the number of iterative steps.

23. The method according to claim 21, wherein the reliability value corresponds to a 2-tuple, which is formed from the log-likelihood ratio and the number of iterative steps.

24. The method according to claim 21, wherein the reliability value corresponds to a tuple, which is formed from the log-likelihood ratio and the mean value of the number of iterative steps.

* * * * *